United States Patent [19]

Rosenblum

[11] 4,302,827
[45] Nov. 24, 1981

[54] RUNWAY AND OBSTACLE DETECTOR TO IMPROVE AIRPLANE LANDING

[76] Inventor: Arthur B. Rosenblum, 5620 Morton St., Philadelphia, Pa. 19144

[21] Appl. No.: 138,645

[22] Filed: Apr. 8, 1980

[51] Int. Cl.³ ............................................ G01S 15/10
[52] U.S. Cl. .................................. 367/116; 340/27 R
[58] Field of Search ............... 367/114, 116, 909, 902; 340/27 R, 27 AT; 343/5 LS

[56] References Cited

U.S. PATENT DOCUMENTS

| | | | |
|---|---|---|---|
| 2,016,907 | 10/1935 | Rice | 367/116 |
| 3,093,807 | 6/1963 | Crane et al. | 367/114 |
| 3,706,068 | 12/1972 | Bradshaw et al. | 367/116 |

*Primary Examiner*—Richard A. Farley

[57] ABSTRACT

An airplane flies through the air because the forward speed of its wings through the air produces lift which is greater than the total weight of the craft. When the forward speed decreases below a certain amount, there is insufficient lift to counteract the weight of the plane and the plane will drop down (or stall). This is the ideal condition of speed at which an airplane lands, but it is important that the stall occur when the plane is only a very short distance (like three feet) above the ground. It is also very important that the plane remain well above the ground or other obstacles until a suitable landing field is reached.

The device herein described uses "sonar" or reflections of sound pulses to give the pilot an audible indication of his exact distance from the ground so that he can know the correct moment to stall or "flare" the plane for a perfect landing. The device also warns of obstacles when they are less than 100 feet below the aircraft to warn the pilot if he is flying too low before reaching the airport.

1 Claim, 1 Drawing Figure

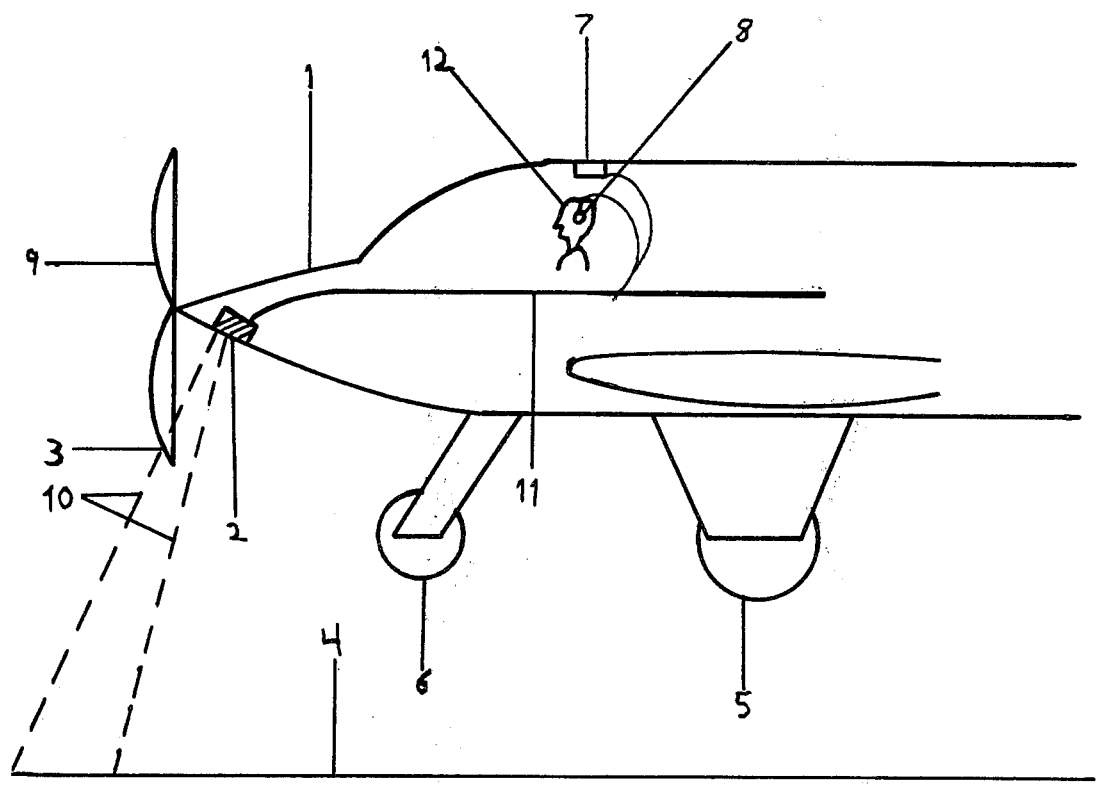

RUNWAY AND OBSTACLE DETECTOR TO IMPROVE AIRPLANE LANDING

PRIOR ART

Until now, a pilot has relied on a barometric or air pressure indicating altimeter which gives a visual indication of distance above the ground based on the increasing pressure as the plane descends. Alternately, a radar altimeter has been used which is based on the reflection of radio waves from the ground. The latter would be sufficient for this purpose except that radio waves are reflected from conducting layers several feed below the surface, which distance is dependent on the moisture content and other factors in the surface. The former method (using atmospheric pressure) is not sensitive enough to measure the small distances required for a perfect landing.

Aside from the above methods, pilots use their vision to judge distance from the ground, but vision is not sufficient for perfect landings at all times, especially when visibility is poor.

The purpose of this invention is to indicate to a pilot when his airplane is sufficiently close to a landing surface for the nose to be raised and the airplane stalled or "flared out" to a perfect landing, and also to indicate the proximity of obstacles below the plane before the airport is reached. The device would be especially useful to inexperienced pilots or to people who presently cannot become pilots because of poor visual depth perception, and to all pilots who are landing a plane in poor visibility conditions.

In this invention, the sonar principal is used to measure the distance above the ground with high frequency sound pulses. A sonar transmitter and receiver such as is presently used for the automatic focus mechanism on some cameras is to be mounted just under and behind the center of the propellor so that the sound source and echo detection mechanism is aimed at a point ahead of and well below the airplane. This ultra-sonic transmitter and receiver combination is mounted in such a way that its transmitted sound pulses are reflected from the ground or from the other obstacles as the plane gets within one hundred feed thereof. The sound pulses are also reflected to some extent from the tips of the propellor each time they pass the ultra-sonic unit.

Instead of being used to focus a lense as in the camera, the time difference between sonar pulses and the echo of the pulses received by the sonar receiver is used to control the frequency of an audio oscilator which produces a tone in the pilots loudspeaker or headphones or some other type of signal that the pilot can easily sense.

The associated electronic circuit is so arranged that the pitch of the tone decreases as the plane gets closer to the ground (or it could be made to increase if that were found superior). Included in the electronic circuitry is another electronic oscilator or tone producer whose pitch remains independent of the relative position of the airplane, but which can be adjusted somewhat by the pilot to provide a reference tone which would have the exact pitch that would be produced by the sonar unit when the plane was at the best height above the ground at which to flare for a perfect landing. This second signal would not be a steady tone, but a series of dashes about once a second. When the first tone, whose pitch decreases as the plane approaches the ground, is of the same pitch as the series of dashes (which is used for comparison), the pilot knows that he is at the ideal height and flares the plane for a perfect landing. In some cases this ideal height might also depend on the plane's relative airspeed and this could be converted into an electrical signal which would be used to modify the comparison pitch in the right direction.

The purpose of mounting the sonar unit just below and behind the propellor is so that the moving tips of the propellor would provide a reflection each time they pass through the edge of the sonar beam. This reflection would produce a periodic pitch change related to the speed of the propellor which would indicate to the pilot that the system is working and can therefore be depended on to indicate the proximity of the runway or other obstacles even in zero visibility weather.

In addition to indicating to the pilot the right height to flare the plane, this sonar device would also make it possible for the pilot to be aware of any building, tree, or obstacle within 100 feet below and ahead of the plane so that in poor visibility condition, the pilot would have a way of knowing if he is getting too close to buildings or other obstacles on the ground. He would be able to distinguish between such obstacles and the landing area because the obstacles would give rather sudden and uneven variations in the pitch of the tone, while the smooth landing area would provide a steady variation as it is approached.

The invention would make it much easier for inexperienced people to land airplanes and also make it much safer to land planes in all conditions of visibility.

The single FIGURE of the drawing is a diagram of the invention.

DESCRIPTION OF DRAWINGS

In the drawing that follows, (1) is the forward part of a plane on which is mounted the sonar transmitter/receiver (2) just behind and below the center of the propellor(9). THe beam (10) of (actually invisible) ultrasonic pulses is projected from the sonar unit (2) in the direction of the ground ahead of and below the airplane. The sound pulses from the sonar unit are reflected from the ground (or obstacle) (4) and are picked up by the sonar receiver located in the same place as the transmitter (2). The time lag between the pulse transmitted and the echo received is converted electrically within this unit (2) into an audible tone which is transmitted by wires (11) to the pilot's loudspeaker or headphones (7 & 8). By comparing this tone with the comparison tones also produced by unit (2), the pilot (12) is able to determine the best moment to flare the plane so that the main wheels (5) contact the ground before the nose wheel (6) is able to do so.

I claim:

1. An apparatus for a pilot controlled airplane comprising an ultrasonic pulse transmitter; ultrasonic echo detecting means including time measuring means for measuring the interval between a transmitted pulse and its echo; converting means for transforming the measured interval into an altitude signal within a range from one foot to about one hundred feet; means for converting said altitude signal into a variable pitch tone signal in the audible range; a tone generator for producing an intermittent flare tone signal; means providing the pilot with the variable pitch signal and the flare tone signal for indicating the desired flaring altitude; and means for mounting the ultrasonic pulse transmitter and echo detecting means so that the ultrasonic pulses are reflected from the revolving propeller tips, thereby generating an intermittent change in the variable pitch tone signal, thus assuring the pilot that the altitude measuring system is operative.

* * * * *